United States Patent [19]
Muller

[11] Patent Number: 5,439,336
[45] Date of Patent: Aug. 8, 1995

[54] STUD END PIERCE NUT

[75] Inventor: Rudolf R. M. Muller, Frankfurt, Germany

[73] Assignee: Profil Verbindungstechnik GmbH & Co KG, Germany

[21] Appl. No.: 138,094

[22] Filed: Oct. 20, 1993

Related U.S. Application Data

[60] Division of Ser. No. 774,437, Oct. 10, 1991, Pat. No. 5,309,618, which is a continuation-in-part of Ser. No. 457,060, Dec. 26, 1989, Pat. No. 5,072,518, and Ser. No. 491,925, Mar. 12, 1990, Pat. No. 5,092,724, which is a division of Ser. No. 196,209, May 19, 1988, Pat. No. 4,915,558, which is a division of Ser. No. 892,017, Aug. 1, 1986, Pat. No. 4,765,057, which is a division of Ser. No. 773,387, Sep. 6, 1985, Pat. No. 4,633,560, which is a division of Ser. No. 563,833, Dec. 21, 1983, Pat. No. 4,555,838, which is a continuation-in-part of Ser. No. 485,099, Mar. 28, 1983, Pat. No. 4,459,073, and Ser. No. 504,074, Jun. 14, 1983, Pat. No. 4,543,701, which is a continuation of Ser. No. 229,274, Jan. 28, 1981, abandoned, said Ser. No. 485,099, is a division of Ser. No. 229,274, Jan. 28, 1981, said Ser. No. 457,060, is a division of Ser. No. 271,123, Nov. 14, 1988, Pat. No. 4,893,394, which is a division of Ser. No. 111,966, Oct. 21, 1987, Pat. No. 4,831,698, which is a continuation-in-part of Ser. No. 69,804, Aug. 17, 1987, Pat. No. 4,810,143, which is a division of Ser. No. 869,507, Jun. 2, 1986, Pat. No. 4,700,470, which is a division of Ser. No. 657,570, Oct. 4, 1984, Pat. No. 4,610,072, which is a continuation-in-part of Ser. No. 563,833, Oct. 4, 1984.

[30] Foreign Application Priority Data

Feb. 2, 1980 [DE] Germany .......................... 3993908

[51] Int. Cl.⁶ .................... F16B 37/04; B23P 11/00
[52] U.S. Cl. .................................. 411/179; 411/181; 29/512; 29/432.2
[58] Field of Search ............... 411/179, 180, 181, 183; 29/432.1, 432.2, 512, 523

[56] References Cited

U.S. PATENT DOCUMENTS

| | | | |
|---|---|---|---|
| 4,018,257 | 4/1977 | Jack | 29/512 X |
| 4,543,701 | 10/1985 | Muller | 29/432.1 |
| 4,555,838 | 12/1985 | Muller | 29/512 X |
| 4,610,072 | 9/1986 | Muller | 29/432.1 X |
| 4,711,021 | 12/1987 | Muller | 411/179 X |
| 4,825,527 | 5/1989 | Landouceur | 29/512 X |
| 4,911,592 | 3/1990 | Muller | 29/432.2 X |

Primary Examiner—Neill R. Wilson
Attorney, Agent, or Firm—Howard & Howard

[57] ABSTRACT

A fastener assembly, a fastener assembly assembled to a member, and a method of attaching a fastener assembly to a member is disclosed. The fastener assembly includes a male fastener element which is fastened to a female fastener element wherein the male fastener element is adapted to engage and pierce through a panel. The female fastener element is adapted to rivet itself to the panel thereby forming a secure mechanical interlock between the female fastener and the panel. In a preferred embodiment, the female and male fastener include threaded surfaces which cooperatively engage one another thereby permitting the male fastener to be easily removed and used to fasten a structural member, or the like to the female fastener/panel assembly. While the fastener assembly is particularly suited for self-piercing applications, it may be used equally well in pre-pierced panel applications.

27 Claims, 2 Drawing Sheets

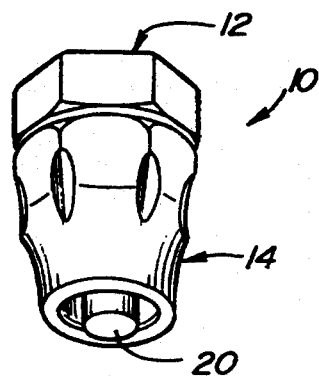
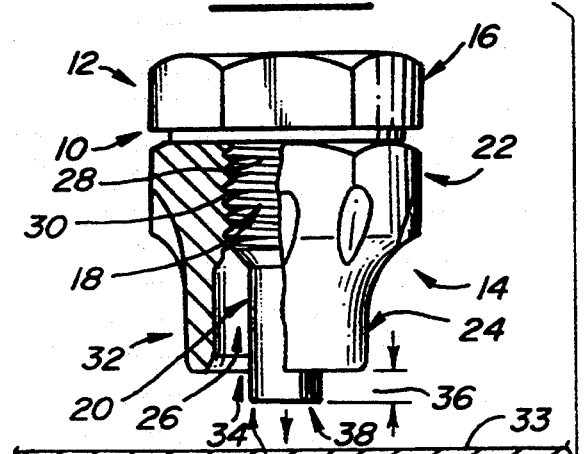
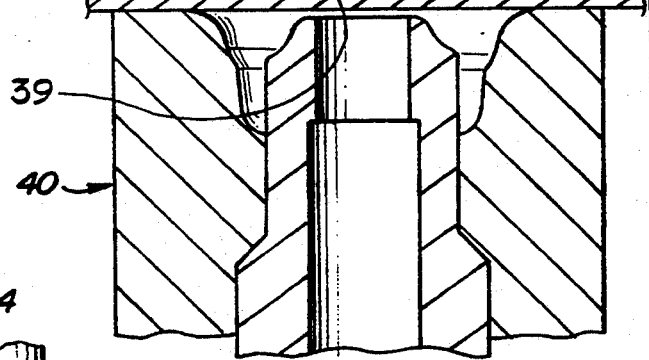
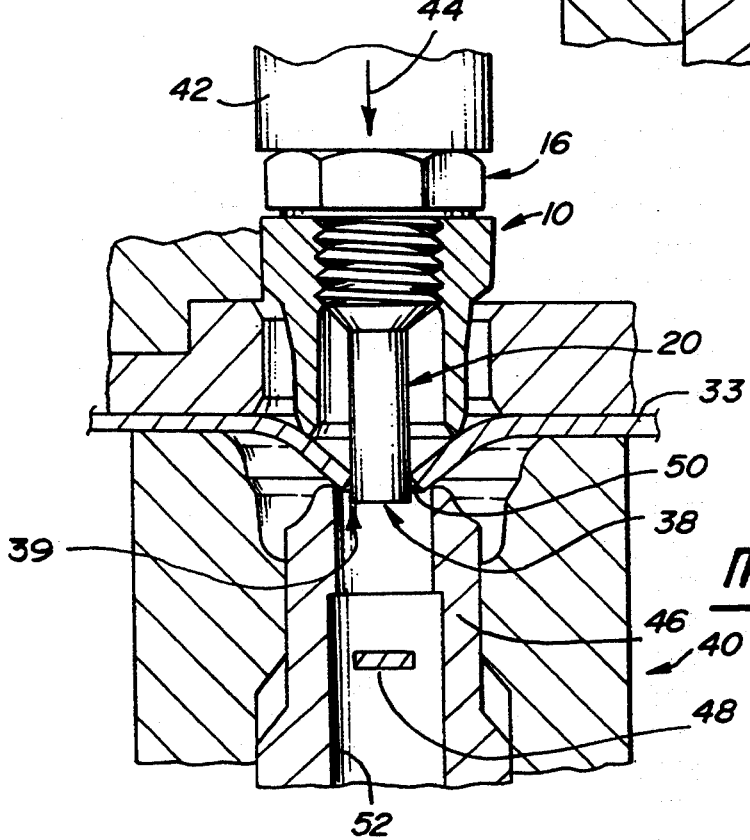

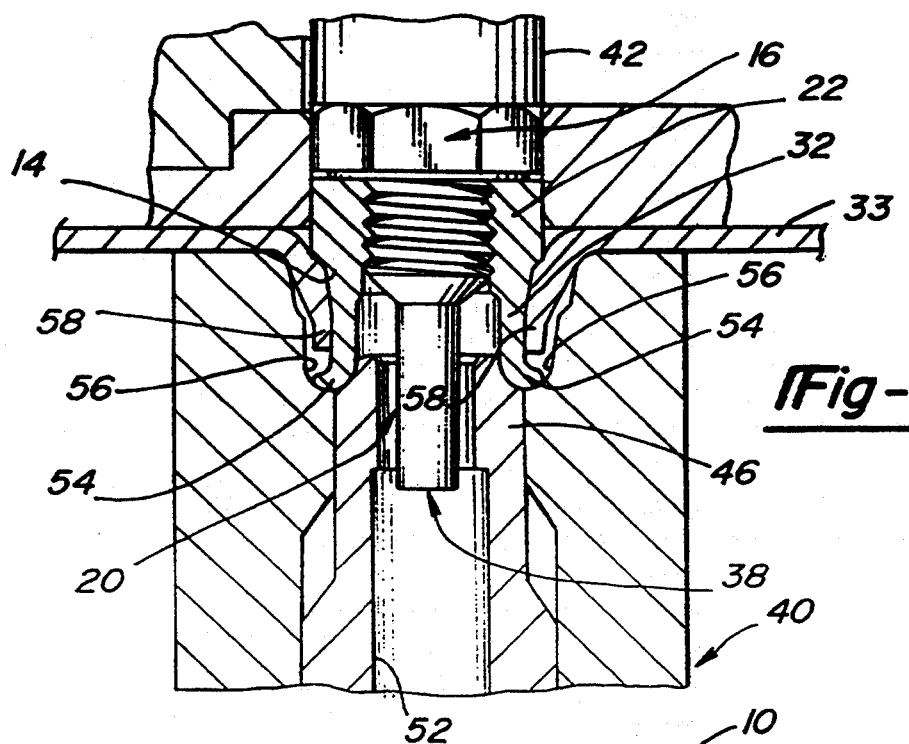
*Fig-4*
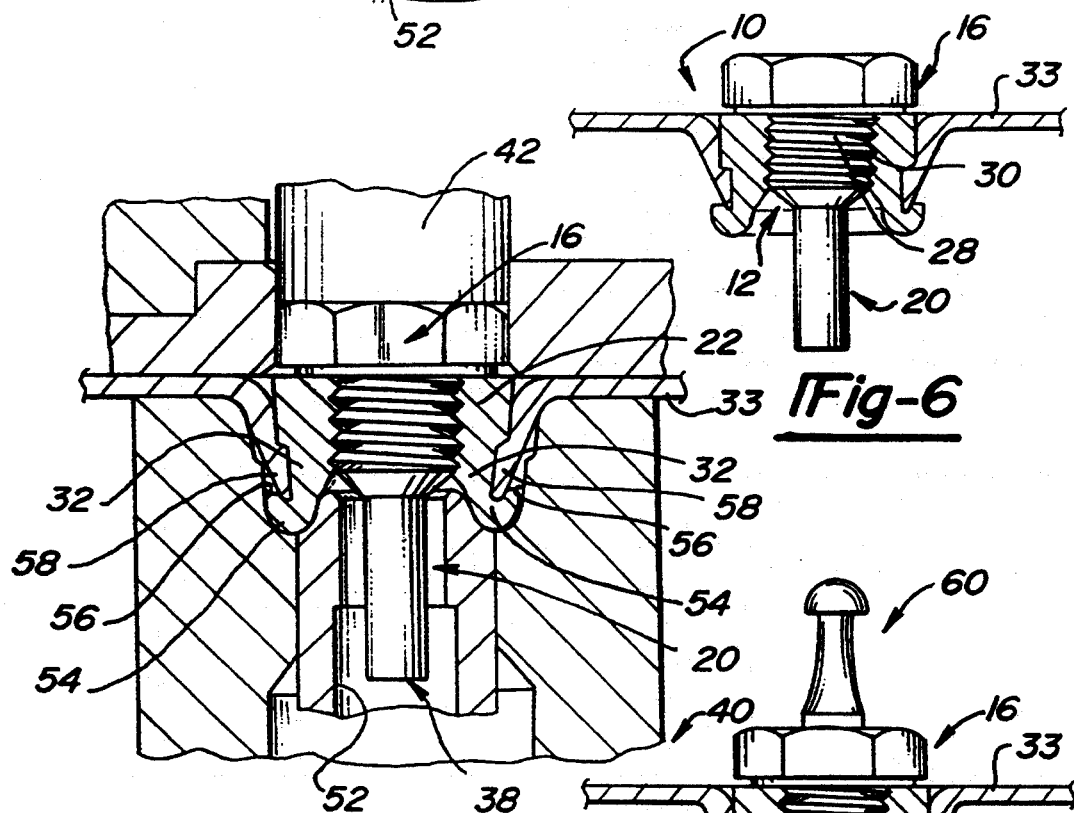
*Fig-5*
*Fig-6*
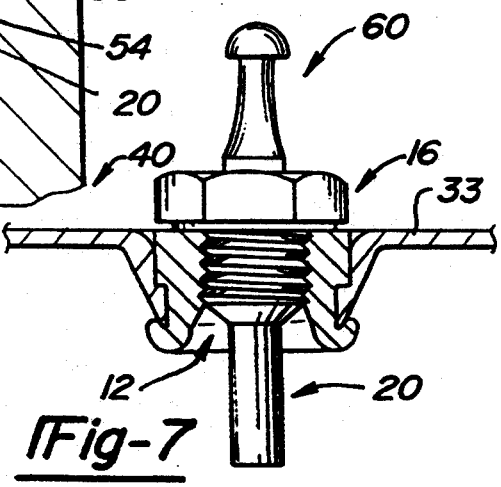
*Fig-7*

5,439,336

STUD END PIERCE NUT

RELATED APPLICATIONS

This is a divisional application Ser. No. 07/774,437 filed on Oct. 10, 1991, now U.S. Pat. No. 5,309,618, is a continuation-in-part of U.S. application Ser. No. 457,060, filed Dec. 26, 1989, now U.S. Pat. No. 5,072,518, which application was a divisional application of application Ser. No. 271,123, filed Nov. 14, 1988, now U.S. Pat. No. 4,893,394, which application was a divisional application of Ser. No. 111,966, filed Oct. 21, 1987, now U.S. Pat. No. 4,831,698, which application was a continuation-in-part of application Ser. No. 069,804, filed Aug. 17, 1987, now U.S. Pat. No. 4,810,143, which application was a divisional application of application Ser. No. 869,507 filed Jun. 2, 1986, now U.S. Pat. No. 4,700,470, which application was a divisional of application Ser. No. 657,570 filed Oct. 4, 1984, now U.S. Pat. No. 4,610,072, which application was a continuation-in-part of application Ser. No. 563,833, filed Dec. 21, 1983, now U.S. Pat. No. 4,555,838, which application was a continuation-in-part application of Ser. No. 504,074, filed Jun. 14, 1983, now U.S. Pat. No. 4,543,701 and Ser. No. 485,099, filed Mar. 28, 1983, now U.S. Pat. No. 4,459,073. Ser. No. 504,074 was a continuation of Ser. No. 229,274 filed Jan. 28, 1981, abandoned, and Ser. No. 485,099 was a divisional application Ser. No. 229,274 filed Jan. 28, 1981, abandoned. Ser. No. 229,274 claims priority to an application filed in the Federal Republic of Germany, Ser. No. 3003908 filed Feb. 2, 1980.

Application Ser. No. 07/774,437 is also a continuation-in-part of U.S. patent application Ser. No. 491,925, filed Mar. 12, 1990, now U.S. Pat. No. 5,092,724, which application is a divisional application of U.S. patent application Ser. No. 196,209 filed May 19, 1988, now U.S. Pat. No. 4,915,558, which application is a divisional of application Ser. No. 892,017, filed Aug. 1, 1986, now U.S. Pat. No. 4,765,057, which application is a divisional of application Ser. No. 773,387, filed Sep. 6, 1985, now U.S. Pat. No. 4,633,560, which application is a divisional of application Ser. No. 563,833, filed Dec. 21, 1983, now U.S. Pat. No. 4,555,838, which application is a continuation-in-part of application Ser. No. 485,099, filed Mar. 28, 1983, now U.S. Pat. No. 4,459,073 and Ser. No. 504,074, filed Jun. 14, 1983, now U.S. Pat. No. 4,543,701, which applications are, respectively, divisional and continuation application Ser. No. 229,274, filed Jan. 28, 1981, now abandoned, which claims priority to an application filed Feb. 2, 1980 in the Federal Republic of Germany, Ser. No. 3003908.

TECHNICAL FIELD

The present invention generally relates to fasteners and more particularly relates to self-piercing and riveting fasteners, including studs, bolts, nuts or the like, including methods of attaching such fasteners to a panel.

BACKGROUND OF THE INVENTION

U.S. Pat. Nos. 3,299,500 and 3,314,138, disclose self-piercing female elements, including nuts, which may be simultaneously clinched to secure the nut in a panel opening. Additionally, U.S. Pat. Nos. 3,938,239 and 4,018,257 disclose self-riveting nuts, including nuts having an annular skirt or barrel portion wherein the free end of the barrel portion is deformed radially outwardly in a die member to form a mechanical interlock with a panel. However, the self-riveting nuts disclosed in the above referenced patents are secured to the panel having a pre-pierced panel opening. This has the disadvantage of requiring two separate operations, the first operation involves creating the panel opening, and a second operation involves installing the female fastener. Additionally, such methods also require very precise centering of the nut relative to the pre-pierced panel opening, wherein a spring biased pin is received through the panel opening and the nut is centered on the pin prior to installation. U.S. Pat. No. 3,926,236 discloses a method of attaching a nut to a panel wherein the panel is pierced by a punch which extends through the nut bore to pierce and secure the nut to a panel in continuous operation, however, the fastener is not a riveting-type fastener which has a barrel portion extending through the pierced panel opening.

U.S. Pat. No. 3,800,401 discloses methods of attaching closures to a container such as a tag ring in a continuous operation. This application and the above-referenced related patents and applications disclose methods and apparatus for attaching male and female elements to a panel in a continuous operation. The preferred methods of installation do not require pre-piercing of the panel, although the fastener is equally suited for installing in a pre-pierced panel opening.

U.S. Pat. Nos. 4,193,333 and 3,871,264 disclose means of attaching a stud-like fastener, wherein the stud includes an annular end portion which penetrates a plate or structural steel member, which may be deformed radially around a plug pierced from the panel.

U.S. Pat. Nos. 1,976,019; 2,456,118; 2,521,505; 3,436,803; 3,754,731; 4,039,099; and 4,092,773 disclose various riveting techniques, wherein the fastener includes an annular end portion which may be press-fitted through an opening in a panel. The annular end portion is then riveted or radially outwardly deformed by a die member having an annular semi-toroidal die cavity and may include a projecting central die portion which is received in the annular riveting end of the fastener.

Although the above-referenced patents do disclose self-riveting male and female fasteners, and methods of installing same, they do not disclose a self-riveting female fastener which is assembled to a male fastener wherein the fastener assembly is installed in a panel in a single operation.

Accordingly, it is an object of this invention to provide a pre-assembled fastener assembly which is adapted to be attached to a panel in a single installation operation. Further, the fastener assembly and method herein disclosed are particularly suited for mass production applications, particularly automotive applications utilizing automatic presses. The fastener assembly of the present invention can be used in a panel having a pre-pierced opening, but is not limited to pre-pierced application inasmuch as the fastener assembly is adapted to pierce the panel during the installation process.

SUMMARY OF THE INVENTION

In light of the foregoing, the present invention provides a fastener assembly adapted to be attached to a panel. The fastener assembly comprises a female fastener element and a male fastener element. The female fastener element has a body portion having an axial bore therethrough and a panel riveting portion integrated with the body portion and axially extending beyond the body portion. The male fastener element includes a portion retained within the axial bore of the female fastener and a quill portion integral with the shank portion. The quill portion extends beyond the panel engaging portion of the female fastener element. The fastener assembly is adapted to be received into a panel and the quill portion of the male fastener is adapted to engage a hole in the panel thereby generally locating the fastener assembly relative to the panel hole and the panel riveting portion of the female fastener is adapted to engage the panel thereby riveting the fastener assembly to the panel.

Preferably, the panel riveting portion of the female fastener includes a generally tubular portion extending from the body portion and is preferably coaxially aligned with the axial bore of the body portion. The body portion of the female fastener is preferably generally tubular having a polygonal outer surface.

When the fastener assembly of the present invention is installed in panels not containing pre-pierced holes, the quill portion of the male fastener preferably includes means for piercing a slug from the panel thereby creating a hole in the panel during the installation process. Preferably, the shank portion of the male fastener includes an externally threaded surface and the axial bore of the female fastener preferably includes an internally threaded surface. The threaded surfaces of the female fastener and the male fastener are adapted to cooperatively engage one another thereby retaining the male fastener within the axial bore of the female fastener.

Preferred embodiments of the male fastener include a head portion integrally joined to said shank portion opposite the quill portion. The head portion can be fashioned in a polygonal shape and can be designed with any number of variations, such as a ball stud configuration, or the like.

In another aspect, the present invention provides a fastener assembly assembled to a member. The fastener assembly and member include a female fastener element, a plastically deformable metal panel member, and a male fastener element. The female fastener element preferably includes a body portion having an axial bore therethrough wherein the body portion narrows into a panel riveting portion. The panel riveting portion terminates in a radially outwardly deformed lip. The metal panel member includes an opening intimately surrounding the panel riveting portion of the female fastener wherein the female fastener is entrapped within the panel opening by the outwardly deformed lip and the body portion of the female fastener. The male fastener element includes a shank portion retained within the axial bore of the female fastener and a quill portion integral with the shank portion. The quill portion extends beyond the radially outwardly deformed lip of the panel riveting portion of the female fastener.

Preferably, the panel riveting portion of the female fastener includes a generally tubular portion which extends from the body portion and is coaxial with the axial bore of the body portion. In a preferred embodiment, the body portion of the female fastener is generally tubular having a polygonal outer surface.

On applications where the fastener assembly is used to pierce a slug from the panel, the quill portion of the male fastener preferably includes means for piercing a slug from the panel thereby creating an opening in the panel.

Preferably, the shank portion of the male fastener includes an externally threaded surface and the axial bore of the female fastener includes an internally threaded surface. Both surfaces being adapted to cooperatively engage one another thereby retaining the male fastener within the axial bore of the female fastener. The male fastener can be fitted with any number of head portions which are integrally joined to the shank portion opposite the quill portion. Such head configurations include polygonal heads and heads fitted with a ball stud portion.

In a preferable embodiment, the radially outwardly deformed lip of the panel riveting portion of the female fastener preferably comprises a generally U-shaped channel which opens generally toward the body portion of the female fastener.

In one embodiment, the metal panel member includes a generally planer portion distal the panel opening and a deformed panel portion proximate the panel opening. The deformed panel portion is displaced from the planer portion and preferably extends radially inwardly to engage the panel riveting portion of the female fastener.

In a preferred method of the present invention, the male fastener is assembled to the female fastener and the quill portion of the male fastener is placed adjacent the panel. The quill portion of the male fastener is then passed through the panel and then the panel riveting portion of the female fastener is driven through the panel. The panel riveting portion of the female fastener is deformed radially thereby entrapping the fastener assembly in the panel. The method preferably includes, simultaneously with passing the quill portion through the panel, using the quill for piercing a slug from the panel. Also, to achieve superior fastening integrity between the assembly and the panel, the method of the present invention includes deforming the panel riveting portion of the female fastener into a U-shaped channel which opens toward the body portion of the female fastener wherein the panel substantially fills the U-shaped opening. Preferably, the panel riveting portion of the female fastener is used for deforming the panel while the riveting portion of the female fastener is driven through the panel.

The fastener assembly of the present invention is particularly suited for transfer from a hopper or other source to an installation device. The assemblies may be arrayed within the installation device by automatic means which stack and align the fasteners readying them for installation.

It will be understood that the female and male fastener of the present invention may be of any number of configurations. As used herein, "fastener" refers not only to the function of the fastener to attach one structural member to a panel, but also the means of attaching the fastener to the panel.

Other advantages and meritorious features will be more fully understood from the following description of the preferred embodiments of the fastener assembly, fastener assembly panel, and method of installation, the appended claims and the drawings, a brief description of which follows.

BRIEF DESCRIPTION OF THE DRAWINGS

FIG. 1 is a isometric view of the fastener assembly of the present invention.

FIG. 2 is a partial cross-sectional side view of the fastener assembly of FIG. 1 positioned for installation in a panel.

FIG. 3 is a partial cross-sectional view of the fastener assembly of FIG. 1 depicting an early stage of fastener installation.

FIG. 4 is a partial cross-sectional view of the fastener assembly of FIG. 1 showing an intermediate stage of fastener installation.

FIG. 5 is a partial cross-sectional view of the fastener assembly of FIG. 1 shown in its final stage of installation.

FIG. 6 is a partial cross-sectional view of the fastener assembly of FIG. 1 shown fully installed in a panel.

FIG. 7 is a partial cross-sectional view of the fastener assembly of FIG. 1 installed in a panel showing a second embodiment of the stud portion of the fastener.

DETAILED DESCRIPTION OF THE PREFERRED EMBODIMENTS

As described above, the fastener assembly of the present invention is particularly adapted for permanent attachment of the assembly to a plate or panel, particularly a metal sheet or the like, such as utilized in the automotive industry. The fastener assembly is particularly suited for installation by way of a conventional press, such as utilized in the automotive industry to form sheet metal parts, including body panels and the like. The method of the present invention is also well suited for application by way of a conventional press. In such applications, the press installs one or more fastener assemblies with each stroke of the press, wherein the fastener assemblies become a permanent part of the panel and are utilized to affix other structural members, such as brackets or the like to the panel. Further, the fastener assembly of the present invention is particularly suited for attachment to relatively thin sheets or panels, such as utilized by the automotive and appliance industries. Accordingly, as used herein, "panel" refers to any plate, panel or metal sheet having a thickness thin enough for practical application of the riveting portion of the female fastener to the panel.

Now referring to FIG. 1, fastener assembly 10 is comprised of male fastener 12 and female fastener 14.

Now referring to FIGS. 1 and 2, male fastener 12 includes head portion 16, shank portion 18, and quill portion 20. Female fastener 14 includes body portion 22 which narrows into riveting portion 24. Female fastener 14 includes bore 26 for receiving and retaining male fastener 12 therein. Although many techniques can be used to engage and retain male fastener 12 within axial bore 26 of female fastener 14, preferably, shank 18 of male fastener 12 is fitted with threads 28 and axial bore 26 of female fastener 14 is fitted with threads 30. Threads 28 cooperatively engage threads 30 thereby positively engaging male fastener 12 within female fastener 14 while also allowing male fastener 12 to be readily removed from female fastener 14 when so desired.

As disclosed in U.S. Pat. Nos. 4,831,698; 4,555,838; and 4,610,072, (hereinafter '698, '838, and '072 respectively), the disclosures of which are herein incorporated by reference, female fastener 14 is adapted to be riveted to panel 33. As disclosed in the '698 and '072 patents, riveting portion 24 is preferably in the shape of a tubular barrel 32. Barrel 32 includes free end 34.

Quill 20 is preferably unthreaded and extends 36 beyond free end 34 of tubular barrel 32 and terminates in a free end having a generally cylindrical piercing surface 39. Although a generally cylindrical piercing surface is preferred 39, other surface geometrics are contemplated such as polygonal, oval and the like. In contrast with the teaching of the '698 patent which uses a punch fastened to a press to pierce the panel during the installation of the female fastener, the fastener assembly of the present invention uses end portion 38 of quill 20 to pierce panel 33 (in non-prepierced applications) during the installation of fastener assembly 10. Accordingly, fastener assembly 10 of the present invention may function as its own installation tool whereby end portion 38 of quill 20 is effective for piercing an opening in panel 33.

As described in the '698 patent, die member 40 cooperates with panel 33 and tubular barrel 32 of female fastener 14 to rivet female fastener 14 to panel 33 thereby forming a secure mechanical interlock between female fastener 14 and panel 33. Although the remaining portion of this specification will focus on the self-piercing attributes of fastener assembly 10, it is to be understood that fastener 10 works equally well on panels having pre-pierced holes. The method of the present invention will now be described in conjunction with FIGS. 3 through FIGS. 5.

Now referring to FIGS. 3 through 5, in applications where fastener assembly 10 is installed by a die press, fastener assembly 10 is fed via an installation head (not shown) into a location adjacent plunger 42. Plunger 42 is driven by one platen of a die press. Die member 40 is attached to a second platen of the die press thereby maintaining a predetermined relationship with plunger 42 and fastener assembly 10. Once fastener assembly 10 is placed in its installation position between plunger 42 and die member 40, plunger is moved 44 against head portion 16 of male fastener 12 thereby driving fastener assembly 10 into contact with panel 33. The '072 and '698 patents both include disclosures of suitable embodiments of installation heads and die assemblies adapted for installing self-piercing and riveting fasteners of the type disclosed herein. For the purpose of this disclosure, it is sufficient to state that plunger 42 is driven toward die member 40 with sufficient force to install fastener assembly 10 in panel 33 supported on die member 40. The details of this installation process will now be discussed.

As end portion 38 of quill 20 is driven against central spring loaded portion 46 of die member 40, sufficient sheer force is exerted against panel 33 by piercing surface 39 of quill 20 to pierce slug ha therefrom. This piercing operation creates opening 50 within panel 33. Slug 48 is discarded by dropping through opening 52 of central die portion 46.

Now referring to FIG. 4, as plunger 42 continues its downward travel, central spring loaded portion 46 of die 40 eventually reaches its lowermost point of travel and is prevented from any further downward movement (mechanism to prevent further movement of central spring loaded portion 46 not shown). At this point, any further downward movement of plunger 42 causes tubular barrel portion 32 of female fastener 14 to spread radially outwardly 54 as dictated by the toroidal cavity shape 56 of die member 40. During the course of the downward movement of female fastener 14, a portion 58 of panel 33 proximate female fastener 14 is downwardly deformed into toroidal cavity 56 of die member 40.

Now referring to FIG. 5, once plunger 42 reaches its furthermost downward stroke, tubular barrel 32 of female fastener 14 is spread radially outwardly such that it forms a lip or, preferably, a U-shaped channel that opens toward body portion 22 of female fastener 14. Depressed panel portion 58 proximate the U-shaped channel substantially fills the U-shaped channel thereby providing a secure mechanical interlock between tubular barrel 32 and panel 33.

As will be understood by those skilled in the art, toroidal surface 56 of die member 40 is preferably smooth and polished to control the radial outward deformation of barrel 32.

Now referring to FIG. 6, in its final assembled configuration, fastener assembly 10 is securely riveted to panel 33. Threaded portions 28, 30 permit the easy removal of male fastener 12 from female fastener 14. Thus, it is easily seen that male fastener 12 can be used to attach other panels, members, braces or the like to panel 33. Or, in an alternative mode, male fastener 12 may be used as a drain plug in installations where a fluid must be periodically drained or accessed such as in automotive oil pans, or the like.

Now referring to FIG. 7, head 16 of male fastener 12 may take on any number of configurations depending on the particular application. For example, head 16 may include ball stud adapter 60 which is adapted to engage and attach to a pivoting arm such as that used on pressurized gas shocks and other similar applications. Other head configurations include rings, pivot posts, threaded shafts, threaded nuts, and the like. In instances where head 16 includes various irregular surfaces such as ball stud adapter 60 and the like, plunger 42 would be designed to accommodate such structures so as not to damage them during the installation process.

Having described the preferred embodiment of the fastener assembly and the preferred methods of attaching the assembly to a panel, it will be understood that various modifications or additions may be made to the preferred embodiments chosen here to illustrate the present invention, without departing from the spirit of the present invention. For example, the dimensions of the male and female fasteners herein disclosed will depend largely upon the particular application at hand and the selected panel thickness. As herein described, the fastener assembly and method of the present invention is particularly suited for attachment to panels such as utilized for body and structure components in automotive and appliance industries. As will be understood, the fastener assembly of the present invention is preferably formed of a plasticly deformable metal, preferably steel, which may be heat treated for surface hardness, ductility, etc. A suitable material for the fasteners herein disclosed is medium carbon steel suitable for cold forming, including SAE 1022, 1023, and 1030 steels. Excellent results have been achieved with steels in the range of SAE 1020 - SAE 1040. Reference may also be made to the earlier cited U.S. patents for further information regarding suitable installation, apparatus, self-piercing and riveting fasteners, and methods of installing same. Accordingly, it is to be understood that the subject matter sought to be afforded protection hereby shall be deemed to extend to the subject matter defined in the appended claim, including all fair equivalents thereof.

I claim:

1. A fastener assembly adapted to be attached to a panel, comprising:
    a female fastener element having a body portion having an axial bore therethrough and a panel riveting portion integral with said body portion and extending generally axially beyond said body portion,
    a male fastener element having a portion retained within said axial bore of said female fastener and a quill portion integral with said shank portion, said quill portion extending beyond said panel riveting portion of said female fastener element, and
    wherein said fastener assembly is adapted to be received into said panel and wherein said quill portion of said male fastener is adapted to engage a hole in said panel thereby generally locating said fastener assembly relative to said panel hole, and wherein said panel riveting portion of said female fastener is adapted to engage said panel thereby riveting said fastener assembly to said panel.

2. The fastener assembly of claim 1, wherein said panel riveting portion of said female fastener includes a generally tubular portion extending from said body portion and is coaxial with said axial bore of said body portion.

3. The fastener assembly of claim 1, wherein said body portion of said female fastener element is generally tubular having a polygonal outer surface.

4. The fastener assembly of claim 1, wherein said quill portion of said male fastener includes means for piercing a slug from said panel thereby creating said hole in said panel.

5. The fastener assembly of claim 1, wherein said shank portion of said male fastener includes an externally threaded surface, and wherein said axial bore of said female fastener includes an internally threaded surface adapted to cooperatively engage said externally threaded surface of said male fastener thereby retaining said male fastener within said axial bore of said female fastener.

6. The fastener assembly of claim 1, wherein said male fastener element includes a head portion integrally joined to said shank portion opposite said quill portion.

7. The fastener assembly of claim 6, wherein said head portion includes a polygonal outer surface.

8. The fastener assembly of claim 7, wherein said head portion includes a ball stud portion.

9. The fastener assembly of claim 1, wherein said portion of said quill which extends beyond said panel riveting portion of said female fastener element includes a generally cylindrical piercing surface.

10. The fastener assembly of claim 9, wherein said cylindrical piercing surface of said quill is not threaded.

11. A fastener assembly assembled to a member comprising:
    a female fastener element having a body portion having an axial bore therethrough, said body portion narrowing into a panel riveting portion, said panel riveting portion terminating in a radially deformed lip,
    a plastically deformable metal panel member including an opening intimately surrounding said panel riveting portion of said female fastener, said female fastener entrapped within said panel opening between said deformed lip and said body portion of said female fastener, and
    a male fastener element having a shank portion retained within said axial bore of said female fastener and a quill portion integral with said shank portion, said quill portion extending beyond said radially outwardly deformed lip of said panel riveting portion of said female fastener element.

12. The fastener assembly and member of claim 11, wherein said panel riveting portion of said female fastener includes a generally tubular portion extending from said body portion and is coaxial with said axial bore of said body portion.

13. The fastener assembly of claim 11, wherein said body portion of said female fastener element is generally tubular having a polygonal outer surface.

14. The fastener assembly of claim 11, wherein said quill portion of said male fastener includes means for piercing a slug from said panel thereby creating said opening in said panel.

15. The fastener assembly of claim 11, wherein said shank portion of said male fastener includes an externally threaded surface, and wherein said axial bore of said female fastener includes an internally threaded surface adapted to cooperatively engage said externally threaded surface of said male fastener thereby retaining said male fastener within said axial bore of said female fastener.

16. The fastener assembly of claim 11, wherein said male fastener element includes a head portion integrally joined to said shank portion opposite said quill portion.

17. The fastener assembly of claim 16, wherein said head portion includes a polygonal outer surface.

18. The fastener assembly of claim 17, wherein said head portion includes a ball stud portion.

19. The fastener assembly of claim 11, wherein said radially deformed lip is deformed outwardly and comprises a generally U-shaped channel which opens generally toward said body portion of said female fastener.

20. The fastener assembly of claim 11, wherein said metal panel member includes a generally planar portion distal said panel opening and a deformed panel portion proximate said panel opening, said deformed panel portion displaced from said planar portion, said deformed panel portion thereby engaging an outer surface of said female fastener.

21. The fastener assembly of claim 11, wherein said deformed lip is radially outwardly deformed.

22. A fastener and panel assembly, comprising:
a plastically deformable metal panel having an opening therethrough,
a female fastening element having a tubular riveting portion received through said panel opening, said riveting portion having a radially deformed portion securing said female fastening element to said panel adjacent said panel opening, and said female fastening element having a threaded bore generally coaxially aligned with said deformed portion, and
a metal male fastener element having a male threaded shank portion threadably received in said female fastener element threaded bore, and an integral quill portion having a free end extending axially beyond said female element riveted portion, said quill free end having a circumferential piercing surface adapted to pierce said panel prior to receipt of said female element tubular riveting portion in said panel.

23. The fastener and panel assembly defined in claim 22, characterized in that said male fastener element quill free end having a relatively sharp circumferential edge adapted to pierce said panel when said quill free end is driven against said panel.

24. The fastener and panel assembly defined in claim 23, characterized in that said male fastener element quill portion free end is generally cylindrical having a diameter substantially less than said female fastener element deformed riveting portion, but greater than said male threaded shank portion.

25. The fastener and panel assembly defined in claim 22, characterized in that said female fastener element riveting portion is deformed radially outwardly and includes a channel-shaped free end portion opening towards said panel, and said panel including a portion adjacent said panel opening deformed in said channel-shaped portion.

26. The fastener and panel assembly defined in claim 25, characterized in that said female fastener element includes a polygonal body portion received in a tubular panel portion adjacent said panel opening.

27. The fastener and panel assembly defined in claim 26, characterized in that said female fastener element body portion is integral and coaxially aligned with said tubular riveting portion and said threaded bore extending through said body portion.

* * * * *